Jan. 14, 1969  E. M. FRITZ  3,421,625
APPARATUS FOR REMOVING IRON FROM WATER
Filed June 6, 1966  Sheet 2 of 2
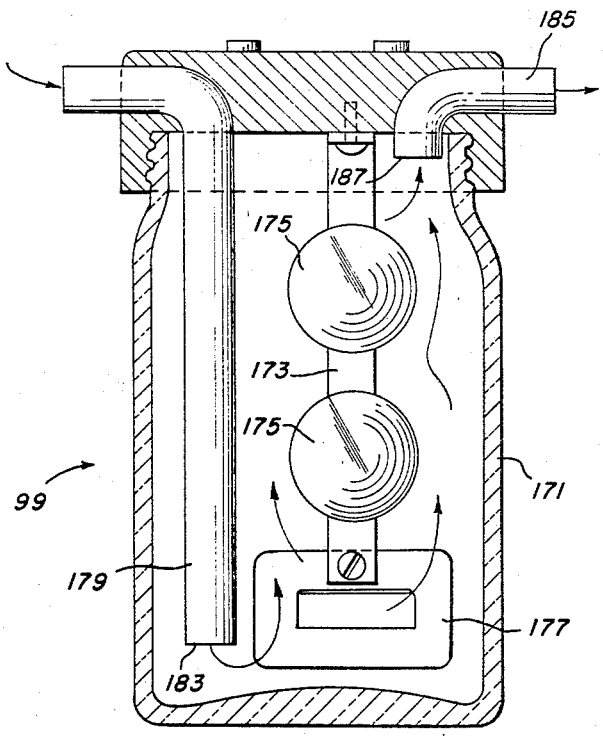
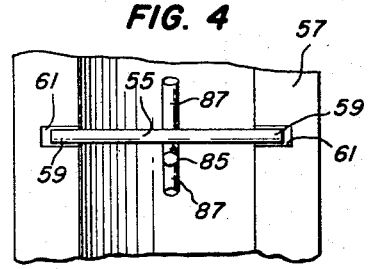
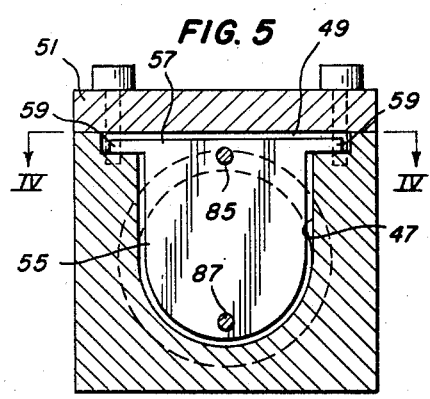
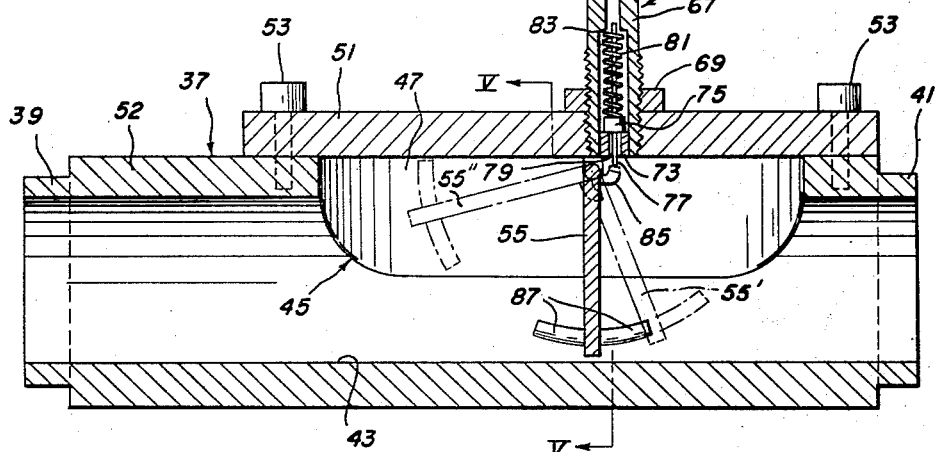
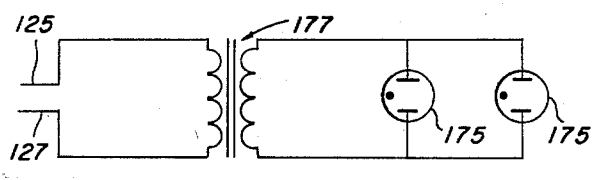
INVENTOR.
ERNEST M. FRITZ
BY John R. Walker, III
Attorney

United States Patent Office 3,421,625
Patented Jan. 14, 1969

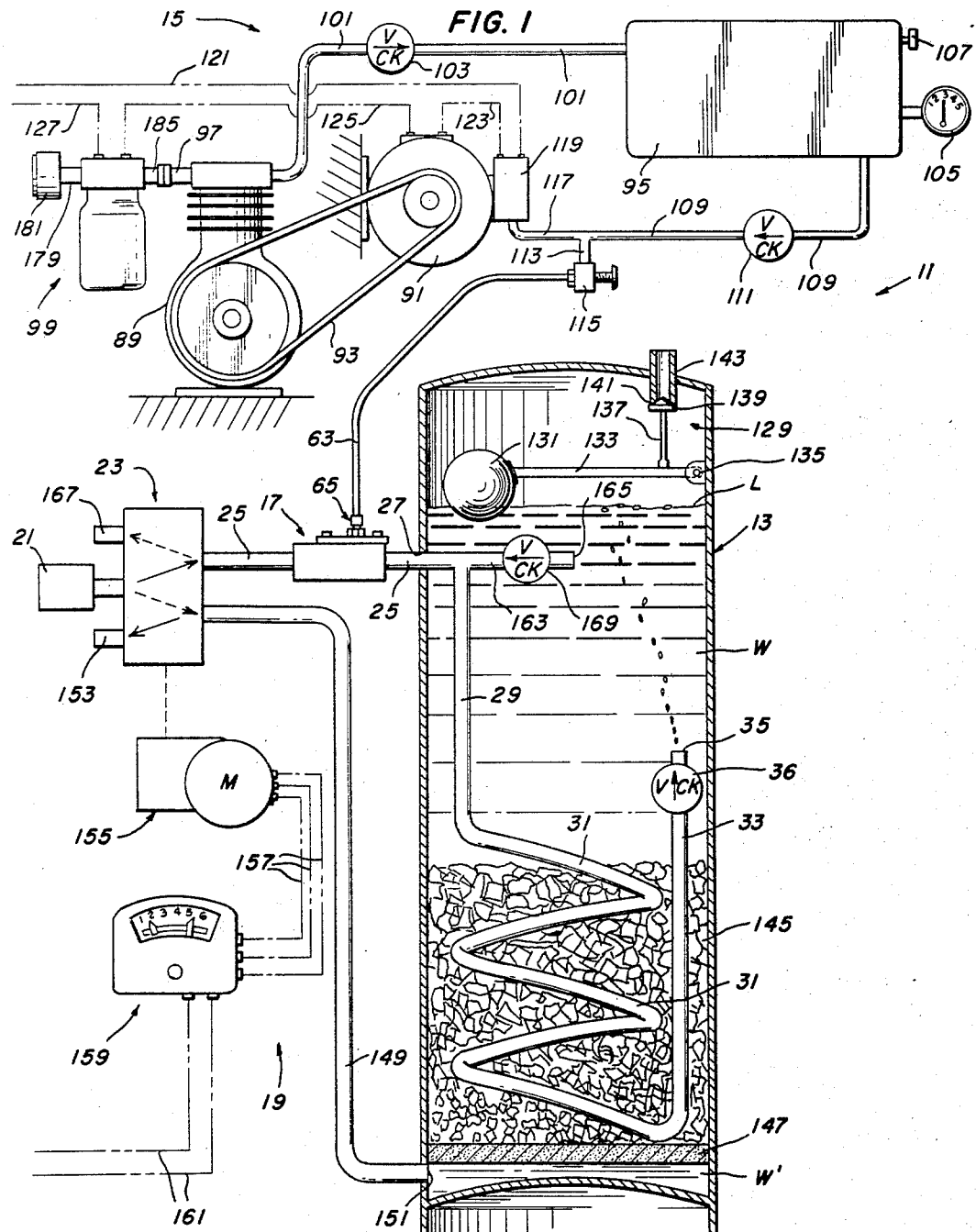

3,421,625
APPARATUS FOR REMOVING IRON FROM
WATER
Ernest M. Fritz, 7357 Memphis-Arlington Road,
Ellendale, Tenn. 38029
Filed June 6, 1966, Ser. No. 555,573
U.S. Cl. 210—101            3 Claims
Int. Cl. C02b 1/26

ABSTRACT OF THE DISCLOSURE

Apparatus for removing iron from water. Mixing valve means is provided in a water inlet conduit for mixing compressed air from a compressed air supply means with the water, from where the water mixed with air is led into a tank through a tortuous path, in which tank filtering means is provided for filtering iron and the like from the water. The mixing valve has means for mixing the compressed air with the water in proportion to and in response to the amount of water flowing through the mixing valve. An ozone producing means is optionally included in conjunction with the compressed air means for supplying ozone to the air.

---

This invention relates to apparatus of the type which is adapted to remove dissolved iron from water by mixing the water with air to precipitate the iron and filter the rust particles from the water.

Heretofore, in devices of the above-mentioned type, there have been certain disadvantages and problems. One of the principal problems with prior devices was the lack of complete exposure of the water to the air under different conditions. For example, if there was an increase in the flow of water into the tank, no provisions were made for more air with a consequent insufficiency of air to accommodate the increased amount of water. In addition, there were problems relative to the lack of capacity of the system since the apparatus were usually operated intermittently to take care of the slow filtering process.

The present invention is directed towards overcoming the above-mentioned and other problems in apparatus for removing iron from water by providing a completely automatic apparatus which can be operated continuously and in which the amount of air mixed with the water is in proportion to the amount of water flowing into the tank.

Thus, one of the objects of the present invention is to provide apparatus for removing the iron from water which efficiently and quickly separates the iron from the water so that it can be operated continuously.

A further object is to provide such apparatus which includes mixing valve means for mixing compressed air with the water in proportion to the amount of water flowing through the mixing valve means.

A further object is to provide such apparatus which includes a water inlet conduit means having a tortuous and elongated portion to provide a complete exposure of the air and the iron in the water.

A further object is to provide such apparatus which includes an improved compressed air system and arrangement that keeps the pressure of the air at a predetermined amount higher than the water pressure so that the amount of air coming into the tank is balanced exactly with the amount leaving.

A further object is to provide improved backwash means for cleaning out the tank wherein the reverse flow of water is withdrawn from adjacent the top of the tank without having to go back through the heretofore mentioned tortuous and elongated portion.

A further object is to provide such apparatus in which optionally is included ozone producing means in conjunction with the compressed air means for supplying ozone to the air.

A futher object is generally to improve the design and construction of apparatus for removing iron from water.

The means by which the foregoing and other objects of the present invention are accomplished and the manner of their accomplishment will be readily understood from the following specification upon reference to the accompanying drawings, in which:

FIG. 1 is a somewhat schematic view of the apparatus of the present invention and showing a sectional view along a vertical plane of the tank per se.

FIG. 2 is a sectional view taken as on a vertical plane of the ozone producing means of the present invention.

FIG. 3 is a sectional view taken as on a vertical plane through the mixing valve unit of the apparatus of the present invention.

FIG. 4 is a fragmentary view taken as on the line IV—IV of FIG. 5.

FIG. 5 is a sectional view taken as on the line V—V of FIG. 3.

FIG. 6 is a schematic view of the electrical circuit means of the ozone producing unit.

Referring now to the drawings in which the various parts are indicated by numerals, the apparatus 11 of the present invention comprises in general an enclosed tank 13, a compressed air system 15, a mixing valve unit 17, a backwashing system 19, filtering means in tank 13, and suitable conduits, pipes, etc.

Water W is fed under pressure into the apparatus 11 from a suitable source, that is indicated diagrammatically as at 21 through a valve 23, which will be described in more detail later in the specification, and through a water inlet conduit 25 into the interior of tank 13. Valve 17 is interposed in water inlet conduit 25 so that the water first passes through the valve before entering the tank 13. Conduit 25 enters the tank through a suitable opening 27 preferably adjacent the upper part of the tank 13. The tank 13 is sealed by suitable means between conduit 25 and the tank at opening 27 so that water cannot leak around the outside of the conduit. From opening 27 conduit 25 extends into the tank and thence preferably downwardly for a portion as at 29, then extends through a plurality of loops 31, and finally conduit 25 extends vertically upwardly for a portion as at 33 to its termination in an open end 35 intermediate the upper and lower ends of the tank. A check valve 36 is preferably provided in portion 33. Thus, the portions 29, 31 and 33 provide a tortuous and elongated portion of conduit 25 through which the mixed air and water pass to provide a complete exposure of the air and the iron in the water, as will be better understood in the description of the operation to be described later in the specification. Mixing valve unit 17 comprises a hollow housing 37 having an entrance end 39, an exit end 41, and a flow chamber 43 for the water to flow through the housing from the entrance end to the exit end. Flow chamber 43 is substantially cylindrical and intermediate the ends thereof the chamber is enlarged as at 45 with vertical wall 47 from its intersection with the cylindrical wall of the flow chamber extending upwardly and providing an upward opening 49 in housing 37. A removable cap 51 closes off opening 49 and forms part of the housing 37. Cap 51 is made watertight to the main body 52 of the housing by suitable means and is removably held by the screws 53 extending through apertures in the cap and threadedly engaged in the main body of the housing. A flapper or flapper plate 55 which conforms to the cross-sectional shape of flow chamber 43, but is slightly smaller in size as will be seen in FIG. 5, extends transversely of the flow chamber intermediate the ends of the enlarged portion 45, as will be best seen in FIG. 3. Pivot means is provided for pivotably supporting flapper 55 adjacent the upper edge 57 thereof from housing 37 for pivot about a horizontal axis extending transversely of the housing. This pivot means preferably comprises a pair of pivot pins 59 extending laterally in opposite directions outwardly from the flapper adjacent edge 57, and which pins 59 extend turnably into slots 61 on opposite sides of the housing.

Compressed air from compressed air system 15 is introduced into mixing valve unit 17 through a compressed air outlet pipe 63 which is attached to an air valve 65 forming part of the mixing valve unit. Air valve 65 preferably comprises a tubular body 67 which is threaded into a threaded aperture in cap 51 and is held in place with a lock nut 69. The lower end of tubular body 67 is in communication with flow chamber 43 and the upper end of the tubular body is connected to outlet pipe 63 by suitable means as a coupling nut 71. An annular valve seat 73 is provided in the lower end of tubular body 67. The valve 75 per se is fixed to a valve stem 77 that is smaller than bore 79 of valve seat 73 and extends downwardly therethrough. A compression spring 81 is provided around a portion of valve stem 77 extending upwardly from valve 75. The spring 81 seats against a shoulder 83 in tubular body 67 and fits on top of valve 75 to urge the valve downwardly against the seat 73.

A rigid pin 85 is fixedly attached to the downstream side of flapper 55 adjacent upper edge 57 in position to engage the lower end of valve stem 77 when the flapper pivots into raised position, as for example the raised position as at 55' in broken lines in FIG. 3, upon the flow of water through flow chamber 43. An increased flow of water will cause the flapper 55 to pivot upwardly even more and allow the compressed air to flow through air valve 65 in an increased amount depending upon the amount of water flow. Thus, the amount of compressed air is responsive to the positioning of flapper 55 for providing more air with more water flow, and less air with less water flow. Therefore, as more air is needed, more air is provided, and when less air is needed, less air is provided. Also, when there is no water flow, the compressed air will be cut off automatically. A stop 87 is preferably provided on either side of flapper 55 to limit the upward travel of flapper 55.

It will be understood that when the flow of water is reversed through flow chamber 43, as when backwashing, flapper 55 will pivot in the opposite direction, as for example into the broken line position as at 55''. Also, it will be understood that the position of flapper 55, when no water is flowing, will be a vertical depending position shown in solid lines in FIG. 3.

Referring now in more detail to the compressed air system 15, in general it comprises a suitable air compressor 89 driven as by an electrical motor 91 which is coupled to the compressor by suitable means as the belt 93, and a compressed air tank 95. In the drawings, 97 indicates the intake air pipe for the compressor 89, which may be, if desired, fitted with an ozone producing unit 99, which will be described in more detail later in the specification. The discharged compressed air from compressor 89 is led through a pipe 101 into tank 95. A check valve 103 is preferably provided in pipe 101. A suitable pressure gauge 105 and a safety valve 107 are provided on tank 95. Leading from tank 95 is a pipe 109 in which is preferably interposed a check valve 111 to prevent water from flowing into the tank 95 in the event of a power failure to motor 91. Pipe 109 branches as at branch 113 to a metering valve 115. Outlet pipe 63 leads from metering valve 115 to air valve 65. Another branch 117 of pipe 109 leads to a suitable pressure responsive switch 119 that is in series with motor 91 and ozone producing unit 99 by means of a suitable circuit, as for example, lead 121 leading from a source of electricity, not shown, to one side of the pressure switch 119, the other side of the pressure switch being connected by lead 123 with motor 91, lead 125 connecting the motor with the ozone producing unit 99, and a lead 127 extending back to said source of electricity. It will be understood that if the ozone unit 99 is not used, the lead 125 simply extends directly to the source of electricity. Pressure switch 119 is of any suitable well known type that can be set so that the switch will close when the pressure in line 117 falls below the selected value and so that the switch will open when the pressure in line 117 rises to a selected value.

In operation, the metering valve 115 permits a balanced condition of the system so that the right amount of air flows through outlet pipe 63. This is important because if too much air is going through pipe 63, the pressure drops below the pressure of the water system, and no air is then able to enter the water system. It should be noted at this point that the pressure of compressed air system 15 should be set on pressure responsive switch 119 so that the air pressure in outlet line 63 is above the pressure of the water. If not enough air is coming through outlet pipe 63, then motor 91 will unnecessarily cycle too frequently. A balanced adjustment of metering valve 115 will allow the air to go out of the outlet pipe 63 as fast as it is coming into the air system 15.

The air which goes into tank 13 with the water collects in the top of tank 13 and when the water line L drops below a predetermined point, which is caused by the air forcing the water downwardly, suitable valve mechanism 129 allows the air to escape. Also, the odors or gaseous smells are removed through means of valve mechanism 129. In the normal operation of the apparatus, this is a continuous process in which the air escapes at the same rate that it comes into the tank 13. Valve mechanism 129 is of any suitable type and preferably includes a float 131 mounted on an arm 133 pivoted as at 135 from tank 13. Another arm 137 is attached to arm 133 and has a valve 139 mounted thereon that seats on the valve seat 141 provided on the end of a pipe 143 extending to the outside atmosphere. It will be understood that as the water level L drops, the valve 139 will unseat from valve seat 141 and allow the air to exhaust through pipe 143.

During operation of apparatus 11, it will be understood that the mixed water and air will co-mingle and cause the oxygen to contact all of the iron in the water which precipitates in the form of rust. The water after entering the tank 13 seeps down through a filter bed 145 of suitable filtering material as an inert mineral, and through filter plate 147 of a porous material that supports the mineral filtering material, leaving the rust and sediment on top of the filter bed. The filtered water W' which is in the tank below the filter plate 147 is discharged through a water outlet conduit 149 having an opening 151 below filter plate 147. Outlet conduit 149 leads to valve 23 which directs the water through the pipe 153 to the point of use.

Valve 23 normally directs the water in the normal operation of apparatus 11 as heretofore described, that is, it directs the outlet water through pipe 153, and directs the inlet water through inlet conduit 25. In other words, the normal position of the valve causes the water to be directed as shown by the solid line arrows in FIG. 1. However, valve 23 is shiftable between said normal position and a second position in which the water is directed as shown by the broken arrows in FIG. 1. The means for shifting valve 23 is by any suitable means, as for example, an electrically driven actuator shown schematically as at 155 which in turn is connected by leads 157 to a timer switch 159, which in turn is connected by leads 161 to a suitable source of electricity. Timer switch 159 is of any suitable well-known type which will cause valve 23 to be shifted by actuator 155 to either said normal or said second position for any selected length of time and at any selected time of day or night. Said second position of valve 23 is used for backwash for cleaning out the system, and the timer switch 159 is set for the frequency and length of the backwash, which is preferably during the nighttime when the system is not normally being used. When valve 23 is shifted to said second position for backwash, the water will flow from the water source 21 through water outlet conduit 149 into the tank 13 up through the filter plate 147 and filter bed 145. This will cause the accumulation of sediment and rust on top of the filter bed to float upwardly towards the upper part of tank 13. A branch conduit 163 which branches off water inlet conduit 25 has an opening 165 in tank 13 adjacent the upper part thereof and below the normal water line L so that the rust and sediment can flow out through branch 163 through water inlet conduit 25, mixing valve unit 17 and drain pipe 167. It will be understood that when the water passes through mixing valve unit 17 as described hereinabove, flapper 55 will swing to the position shown as at 55″ and no air will be introduced into the system. A check valve 169 is provided in branch 163 to allow the above-mentioned flow during backwashing yet prevent water flow through the branch during normal operation of the apparatus.

As heretofore stated, if desired, ozone producing unit 99 may be utilized. Unit 99 preferably comprises a hollow container 171 having mounted therein on a suitable bracket 173 ozone producing tubes or ultraviolet producing lamps 175 and a transformer 177 for energizing the lamps to produce ozone. Suitable circuit means such as that shown in FIG. 6 may be provided for connecting the transformer 177, lamps 175 and the source of electricity. Unit 99 also includes an inlet tube 179 which preferably has air filter 181 on one end thereof and which extends into container 171 where it terminates in an open end 183 adjacent the lower end of container 171. An outlet tube 185 is provided in container 171 with the open end 187 thereof being preferably located adjacent the upper end of the container so that tube 185 leads from the container at a remote place from inlet tube open end 183, so that lamps 175 are disposed between open ends 183 and 187. Thus, the ozone producing means is in the path of flow of the air through container 171. Tube 185 is connected to intake pipe 97 of compressor 89 so that the ozone laden air flows into the compressor.

From the foregoing description, it will be understood that a very efficient and fully automatic means is provided for removing iron and sediment from water and which can be run continuously if desired. It will further be understood that a unique means is provided for furnishing the right amount of air to the water and for insuring that there is substantially complete exposure of the iron to the oxygen in the air.

Although the invention has been described and illustrated with respect to a preferred embodiment thereof, it is to be understood that it is not to be so limited since changes and modifications may be made therein which are within the full intended scope of this invention as hereinafter claimed.

I claim:

1. Apparatus for removing iron from water comprising a tank, a water inlet conduit means having an open outlet end in said tank for passing water into said tank, compressed air means for supplying air under pressure and including a compressed air outlet pipe, mixing valve means disposed in said water inlet conduit means and connected to said air outlet pipe for mixing compressed air with the water in proportion to the amount of water flowing through said mixing valve means, said water inlet conduit means between said mixing valve means and said open outlet end having a tortuous and elongated portion to provide a substantially complete exposure of the air and the iron in the water, valve means adjacent the upper end of said tank for permitting the air to leave said tank, filtering means in said tank for filtering the iron from the water to provide filtered water, water outlet conduit means having an opening below said filtering means for providing means for withdrawing the filtered water from said tank, said mixing valve means comprising a hollow housing having a flow chamber therein, a flapper disposed transversely of said flow chamber in the path of water flow through said chamber, means pivotally supporting said flapper in said chamber for pivotable movement of said flapper responsive to water flow through said chamber into one of a plurality of positions corresponding to the water flow through said chamber, valve means in said compressed air outlet pipe and responsive to positioning of said flapper for providing more air with more water flow and less air with less water flow.

2. Apparatus for removing iron from water comprising a tank, a water inlet conduit means having an open outlet end in said tank for passing water into said tank, compressed air means for supplying air under pressure and including a compressed air outlet pipe, mixing valve means disposed in said water inlet conduit means and connected to said air outlet pipe for mixing compressed air with the water in proportion to and in response to the amount of water flowing through said mixing valve means, said water inlet conduit means between said mixing valve means and said open outlet end having a tortuous and elongated portion to provide a substantially complete exposure of the air and the iron in the water, valve means adjacent the upper end of said tank for permitting the air to leave said tank, filtering means in said tank for filtering the iron from the water to provide filtered water, water outlet conduit means having an opening below said filtering means for providing means for withdrawing the filtered water from said tank, backwash means including timer means for automatically reversing the flow of water to cause water to flow into said tank at a predetermined time for a predetermined duration through said water outlet conduit means, and including branch conduit means having an opening in said tank adjacent the upper part thereof and below the normal water line in said tank, said branch conduit means connected to said water inlet conduit means, and check valve means in said branch conduit means for permitting the water to bypass said elongated and tortuous portion and flow out through said water inlet conduit means during backwashing and for preventing flow through said branch conduit means during normal operation of said apparatus.

3. Apparatus for removing iron from water comprising a tank, a water inlet conduit means having an open outlet end in said tank for passing a continuous stream of water into said tank, compressed air means for supplying air under pressure and including a compressed air outlet pipe, means in conjunction with said compressed air means for maintaining the air pressure at a substantially constant predetermined amount higher than the pressure of the water passing into said tank, mixing valve means disposed in said water inlet conduit means and connected to said air outlet pipe, said mixing valve means comprising a hollow housing having a flow chamber therein, a flapper disposed transversely of said flow chamber in the path of water flow through said chamber, means pivotally supporting said flapper in said chamber for pivotable movement of said flapper responsive to water flow through said chamber into one of a plurality of positions corresponding to the water flow through said chamber, valve means in said compressed air outlet pipe and responsive to positioning of said flapper for providing more air with more water flow and less air with less water flow; said water inlet conduit means between said mixing valve means and said open outlet end having a tortuous and elongated portion to provide a substantially complete exposure of the air and the iron in the water, valve means adjacent the upper end of said tank for permitting the air to leave said tank, filtering means in said tank for filtering the iron from the water to provide filtered water, water outlet conduit means having an opening below said filtering means for providing means for withdrawing the filtered water from said tank; backwash means including means for reversing the flow of water to cause water to flow into said tank through said water outlet conduit means, and including branch conduit means having an opening in said tank adjacent the upper end thereof and below the normal water line in said tank, said branch conduit means connected to said water inlet conduit means, and check valve means in said conduit means for permitting the water to bypass said elongated tortuous portion and flow out through said water inlet conduit means during backwashing and for preventing flow through said branch conduit means during normal operation of said apparatus.

References Cited

UNITED STATES PATENTS

| | | | |
|---|---|---|---|
| 989,942 | 4/1911 | Bain | 210—101 X |
| 998,317 | 7/1911 | Winckler et al. | 210—101 X |
| 2,009,230 | 7/1935 | Hartman | 210—192 X |
| 2,048,158 | 7/1936 | Goodwin | 210—120 |
| 2,352,901 | 7/1944 | Klein | 210—120 |
| 2,660,559 | 11/1953 | Prime | 210—120 X |
| 3,298,791 | 1/1967 | Meyer et al. | 210—136 X |

REUBEN FRIEDMAN, *Primary Examiner.*

JOHN ADEE, *Assistant Examiner.*

U.S. Cl. X.R.

210—103, 120, 136, 138, 192, 205, 277